United States Patent
Cunningham et al.

(10) Patent No.: US 7,305,373 B1
(45) Date of Patent: Dec. 4, 2007

(54) INCREMENTAL REDUCED ERROR PRUNING

(75) Inventors: Robert Cunningham, Lexington, MA (US); Oliver Dain, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 479 days.

(21) Appl. No.: 10/395,859

(22) Filed: Mar. 24, 2003

Related U.S. Application Data

(60) Provisional application No. 60/432,050, filed on Dec. 10, 2002.

(51) Int. Cl.
  G06F 17/00 (2006.01)
  G06N 5/02 (2006.01)
(52) U.S. Cl. ...................................................... 706/47
(58) Field of Classification Search .................. 706/47
  See application file for complete search history.

(56) References Cited

U.S. PATENT DOCUMENTS 5,719,692 A * 2/1998 Cohen .......................... 706/47

OTHER PUBLICATIONS

Ali,KM et. al. "Error reduction through learning multiple descriptions" 1996.*
Fürnkranz,J et. al. "Incremental reduced error pruning" 1994.*
Cohen,WW "Learning trees and rules eith set-valued features" 1996.*
Cohen,WW et. al. "A simple, fast, and effective rule learner" 1999.*
Frank,E et. al. "Generating accurate rule sets without global optimization" 1998.*
Mingers,J "An empirical comparison of pruning methods for decision tree induction" 1989.*
Pagallo,G et. al. "Boolean feature discovery in empirical learning" 1990.*
Quinlan,JR et. al. "FOIL: A midterm report" 1993.*
Quinlan,JR et. al. "Induction of Logic Programs: FOIL and related systems" 1995.*
Zelle,JM et. al. "Combining top-down and bottom-up techniques in inductive logic programming" 1994.*
Fast Effective Rule Induction by William W. Cohen.
A Tight Integration of Pruning and Learning by Johannes Fürnkranz.
Pruning Algorithms for Rule Learning by Johannes Fürnkranz.
Machine Learning, Copyright © by The McGraw-Hill Companies, Inc., pp. 282-291.
SLIQ: A Fast Scalable Classifier for Data Mining by Manish Mehta, Rakesh Agrawal and Jorma Rissanen.

* cited by examiner

*Primary Examiner*—David Vincent
*Assistant Examiner*—Benjamin Buss
(74) *Attorney, Agent, or Firm*—Muirhead and Saturnelli, LLC

(57) ABSTRACT

Described are techniques used automatic generation of classification rules used in machine learning. A single rule is formed of one or more logical expressions and an associated target. Using a set of training data, rules are formed one logical expression at a time using special data structures that require each feature to be sorted only once per rule formation. The FOIL gain metric is used in determining optimal splits for categorical features. Rule formation ceases with the production of five bad rules in which a bad rule is one in which there are more negative than positive examples in the training data set.

28 Claims, 10 Drawing Sheets

| Feature1 | Feature2 | ... | Feature n |
|----------|----------|-----|-----------|
| val 1 .. | val2 ..  | ..  | val n ..  |

INCREMENTAL REDUCED ERROR PRUNING

RELATED APPLICATIONS

This application claims priority to U.S. Provisional Patent Application No. 60/432,050, filed on Dec. 10, 2002, which is incorporated by reference herein.

STATEMENT OF GOVERNMENT INTEREST

The invention was made with Government support under contract No. F19628-00-C-0002 by the Department of the Air Force. The Government has certain rights in the invention.

BACKGROUND

1. Technical Field

This application generally relates to machine learning techniques, and more particularly to techniques for producing classification rules.

2. Description of Related Art

Techniques may be used to perform classification of data such as, for example, related to objects and the occurrence of events, in an automated manner. Data to be classified may be represented as a set of data items. In one representation, each data item includes one or more attribute values for a number of attributes. One classification technique uses a set of rules to classify the data items in accordance with attribute values placing each data item into a class. For example, a program may be executed in a computer system which applies a set of rules to unclassified input data. The program may produce as output a classification of each of the data items included in the input data.

Different techniques may be used in connection with producing a set of rules. The rules may be manually produced. However, manual techniques may become too expensive in terms of time, for example, as the complexity of the input data set and the associated classification increases. Additionally, the manual rule production requires a user to have knowledge about the data items and the classifications.

An alternative class of techniques automate the production of the set of rules. For example, a rule generation program may be executed in a computer system to automate rule production. It may be desirable to have the automated technique be efficient in terms of computer resources. If the rule generation is performed interactively, it may be particularly desirable to utilize a technique that seeks to minimize execution time.

Unclassified input data may include categorical and numeric, or non-categorical, data. "Categorical data" may be characterized as data that cannot naturally be ordered by a metric such as, for example, names of automobile producers, products offered by one or more manufacturers, and the like. It may be desirable to have an efficient automated technique for rule generation that may be used with categorical and non-categorical features. It may also be desirable that the rule generation technique produce rules that properly classify the given input data, and more generally, any input data set to a particular degree of correctness. In other words, it may be desirable that the generated rules are not overly specific to any particular input set, but rather achieve a high uniform degree of correct classification in accordance with all possible input data sets.

SUMMARY OF THE INVENTION

In accordance with one aspect of the invention is a method for generating a classification rule. Feature vectors of values of a training data set are determined. Values of each of the feature vectors are sorted in accordance with a ranking of values included in each of the feature vectors producing sorted feature vectors. A first condition of the classification rule is determined using a training data set. Values are removed from the sorted feature vectors that are associated with examples included in the training data set that are uncovered with respect to the first condition while maintaining the sorted feature vectors in sorted order. At least one additional subsequent condition of the classification rule using the sorted feature vectors is determined.

In accordance with another aspect of the invention is a method of forming a classification rule for classifying input data by determining a single condition of the classification rule at a time. When forming a first condition, each of a plurality of feature vectors including feature values associated with examples in the input data is sorted in accordance with feature values of each feature vector producing sorted feature vectors. The sorted feature vectors are used when adding each next condition to the classification rule such that the feature vectors are sorted only when determining the first condition of the classification rule.

In accordance with another aspect of the invention a computer program product that generates a classification rule comprising: machine executable code that determines feature vectors of values of a training data set; machine executable code that sorts values of each of said feature vectors in accordance with a ranking of values included in each of said feature vectors producing sorted feature vectors; machine executable code that determines a first condition of the classification rule using a training data set; machine executable code that removes values from said sorted feature vectors that are associated with examples included in said training data set that are uncovered with respect to said first condition while maintaining said sorted feature vectors in sorted order; and machine executable code that determines at least one additional subsequent condition of the classification rule using said sorted feature vectors.

In accordance with yet another aspect of the invention is a computer program product that forms a classification rule for classifying input data comprising machine executable code that determines a single condition of said classification rule at a time, wherein, when forming a first condition, each of a plurality of feature vectors including feature values associated with examples in said input data is sorted in accordance with feature values of said each feature vector producing sorted feature vectors, and said sorted feature vectors are used when adding each next condition to the classification rule such that said feature vectors are sorted only when determining said first condition of the classification rule.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example of an embodiment of an input data set included in the system of FIG. 4;

DETAILED DESCRIPTION OF
EMBODIMENT(S)

Figure 1:
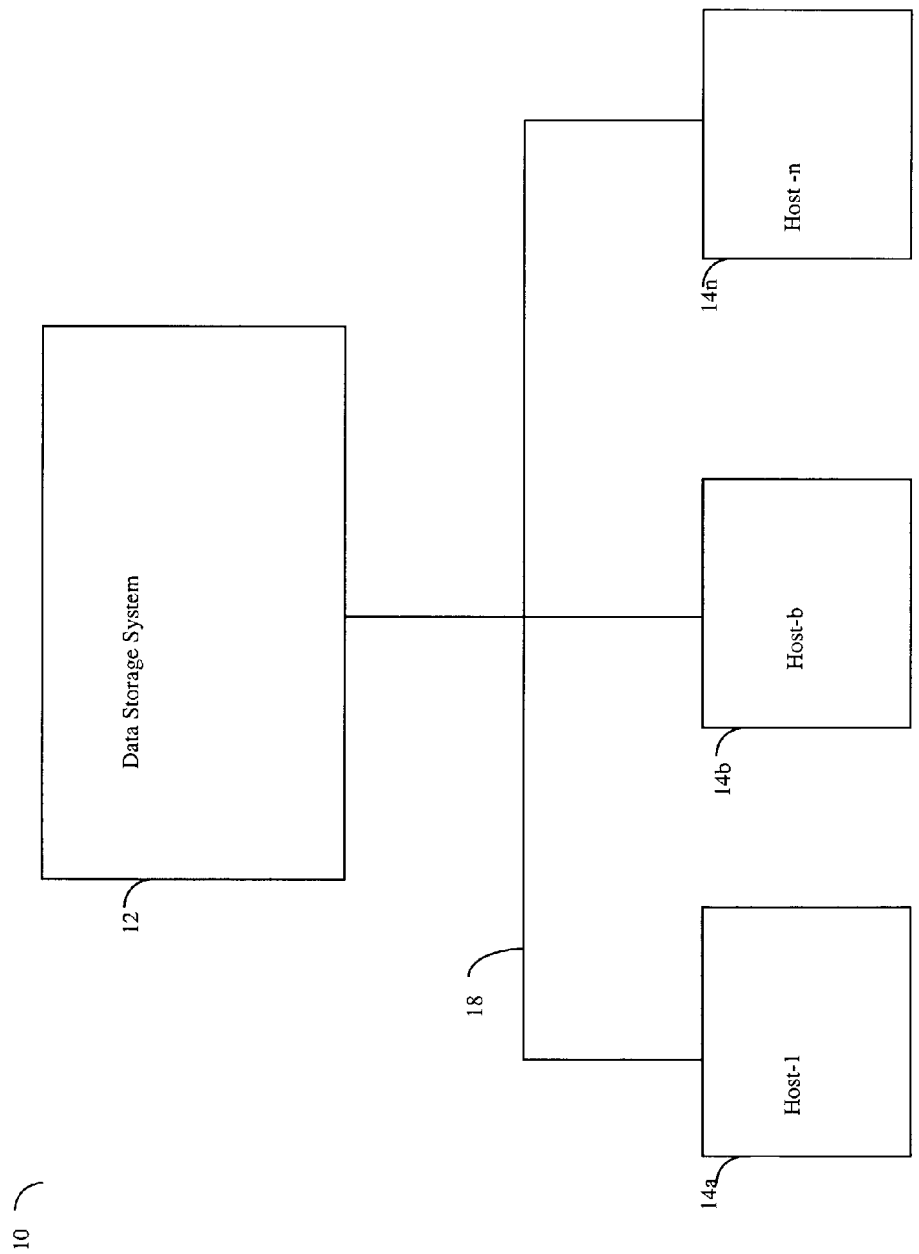
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n through communication medium 18. In this embodiment of the computer system 10, the N hosts 14a-14n may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire, wireless, or other connection known in the art. For example, the communication medium 18 may be the Internet, an intranet, network or other connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. Each of the processors included in the host computer systems 14a-14n may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n, as well as those components that may be included in the data storage system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, ESCON, Fibre Channel, or GIGE (Gigabit Ethernet), and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation, such as a read or a write operation.

Figure 2:
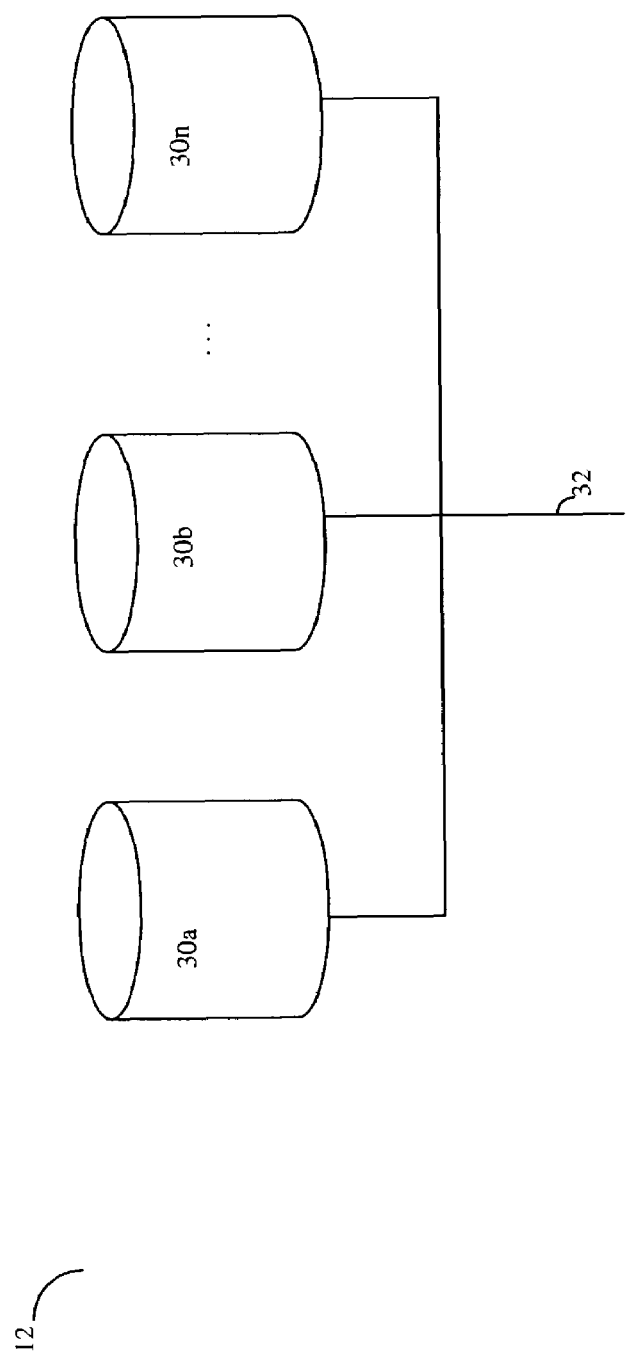
FIG. 2 is an example of an embodiment of a data storage system of the computer system of FIG. 1.

Referring now to FIG. 2, shown is an example of an embodiment of a data storage system 12 that may be included in the computer system 10 of FIG. 1. The data storage system 12 in this example may include a plurality of data storage devices 30a through 30n. The data storage devices 30a through 30n may communicate with components external to the data storage system 12 using communication medium 32. Each of the data storage devices may be accessible to the hosts 14a through 14n using an interface connection between the communication medium 18 previously described in connection with the computer system 10 and the communication medium 32. It should be noted that a communication medium 32 may be any one of a variety of different types of connections and interfaces used to facilitate communication between communication medium 18 and each of the data storage devices 30a through 30n.

The data storage system 12 may include any number and type of data storage devices. For example, the data storage system may include a single device, such as a disk drive, as well as a plurality of devices in a more complex configuration, such as with a storage area network and the like. Data may be stored, for example, on magnetic, optical, or silicon-based media. The particular arrangement and configuration of a data storage system may vary in accordance with the parameters and requirements associated with each embodiment.

Each of the data storage devices 30a through 30n may be characterized as a resource included in an embodiment of the computer system 10 to provide storage services for the host computer systems 14a through 14n. The devices 30a through 30n may be accessed using any one of a variety of different techniques. In one embodiment, the host systems may access the data storage devices 30a through 30n using logical device names or logical volumes. The logical volumes may or may not correspond to the actual data storage devices. For example, one or more logical volumes may reside on a single physical data storage device such as 30a. Data in a single data storage device may be accessed by one or more hosts allowing the hosts to share data residing therein.

Figure 3:
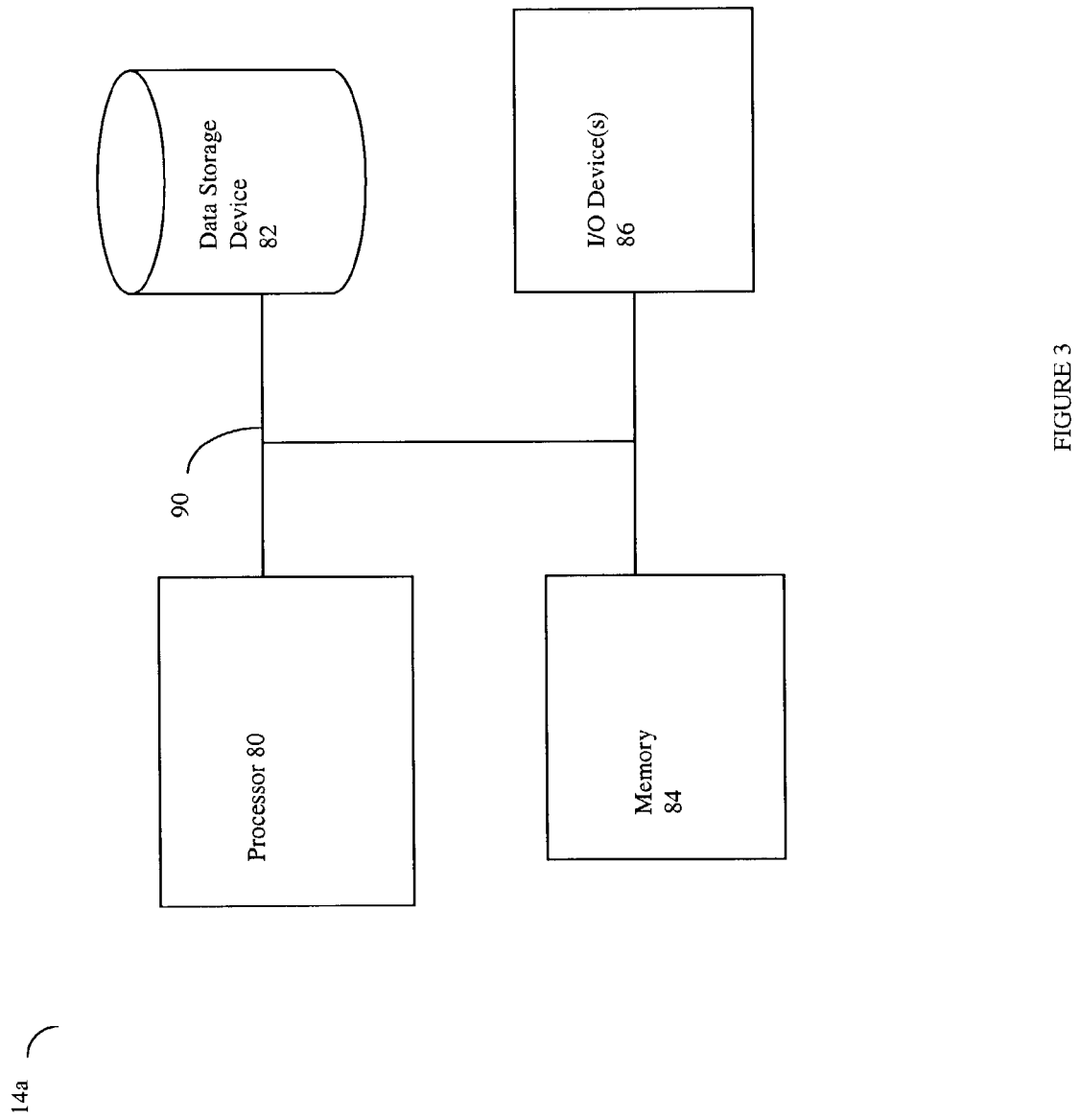
FIG. 3 is an example of an embodiment of components that may be included in a host system of the computer system of FIG. 1.

Referring now to FIG. 3, shown is an example of an embodiment of a host or user system 14a. It should be noted that although a particular configuration of a host system is described herein, other host systems 14b-14n may also be similarly configured. Additionally, it should be noted that each host system 14a-14n may have any one of a variety of different configurations including different hardware and/or software components. Included in this embodiment of the host system 14a is a processor 80, a memory, 84, one or more I/O devices 86 and one or more data storage devices 82 that may be accessed locally within the particular host system. Each of the foregoing may communicate using a bus or other communication medium 90. Each of the foregoing components may be any one of more of a variety of different types in accordance with the particular host system 14*a*.

Computer instructions may be executed by the processor 80 to perform a variety of different operations. As known in the art, executable code may be produced, for example, using a loader, a linker, a language processor, and other tools that may vary in accordance with each embodiment. Computer instructions and data may also be stored on a data storage device 82, ROM, or other form of media or storage. The instructions may be loaded into memory 84 and executed by processor 80 to perform a particular task.

Figure 4:
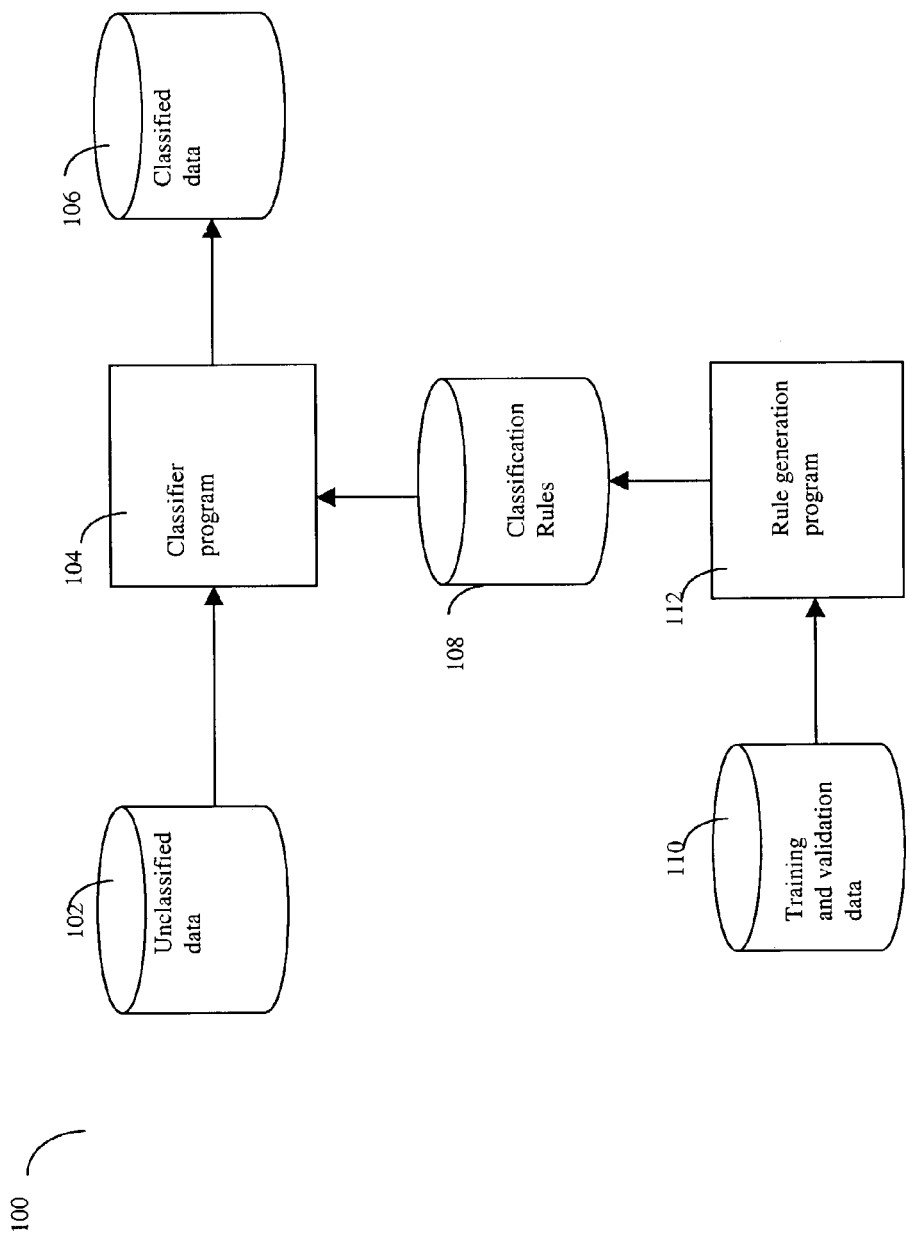
FIG. 4 is an example of an embodiment of components that may be included in a rule generation and classifier system.

Referring now to FIG. 4, shown is an example of an embodiment of components that may be included in a rule generation and classifier system 100. The components of the rule generation and classifier system 100 may reside and be executed on one or more of the host computer systems included in the computer system 10 of FIG. 1. The rule generation and classifier system 100 in this particular embodiment includes unclassified data 102, the classifier program 104, classified output data 106, classification rules 108, a rule generation program 112, and an input data set or training and validation data 110. The classifier program 104 may be executed which reads the unclassified data 102 as input. Classifier program 104 may also read as input classification rules 108. The classifier program 104 then classifies the unclassified data 102 in accordance with classification rules 108 to produce the output classified data 106. The classification rules 108 may be produced using the rule generation program 112. The rule generation program 112 uses input training and validation data 110 to produce the classification rules 108 as an output in an automated fashion.

It should be noted that components included in FIG. 4, such as the input and output data sets, may also be stored in the data storage system.

The rule generation program 112 and the classifier program 104 may be executed on any one of a variety of different computer processor or processors of a host system, for example, as described elsewhere herein in more detail. Each of the rule generation program 112 and the classifier program 104 may also be produced using any one of a variety of different techniques or a combination thereof. For example, in one embodiment, the rule generation program may be generated using the C++ programming language and a compiler, or other translator. The data and the components included in the rule generation and classifier system 100 are described in more detail in following paragraphs and in connection with other figures.

Figure 5A:
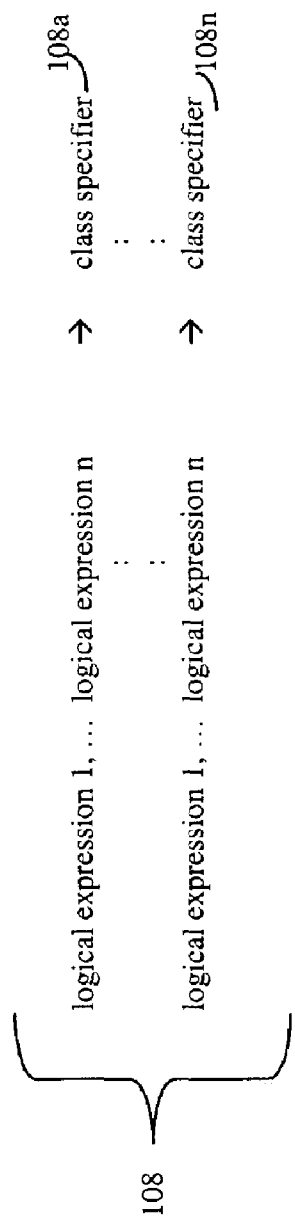
FIG. 5A is an example of a representation of classification rules.

Referring now to FIG. 5A, shown is an example of a representation of classification rules 108 in a table format. The representation of the classification rules 108 includes one or more rules represented by corresponding ones of rows 108*a* through 108*n*. Each rule may include one or more logical expressions on the left hand side of the rule and an associated class specifier on the right hand side of the rule. In this particular embodiment, a rule generation program 112 outputs classification rules 108 in a format that is human readable. Other embodiments may output classification rules in any one of a variety of other different forms and formats.

Figure 5B:
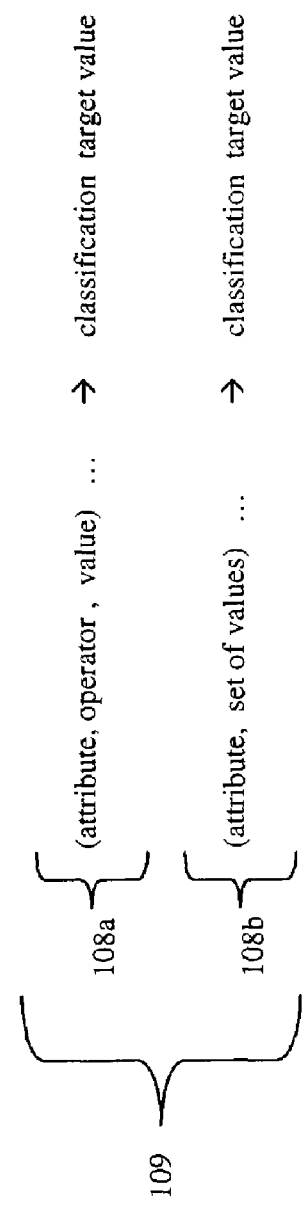
FIG. 5B is an example of a representation of a single classification rule.

Referring now to FIG. 5B, shown is a more detailed example 109 of a rule 108*a* and a rule 108*b* that may be included in the classification rules 108. The rule 108*a* in this example includes one or more logical expressions in which each logical expression is represented by the triple of an attribute, an operator, and a value. The attribute corresponds to a particular attribute of the input data items comprising the unclassified data 102. The operator in this example represents a logical operator such as equal to, less than, greater than and the like. The value of the triple represents a value that is compared to the value of the attribute of a particular data item. The right hand side of the rule includes a classification target value or a target. Rule representation 108*b* in this example includes an attribute and set of values pair mapped to a classification target value.

A rule including a categorical feature may take the form described in 108*b* in which a particular attribute is compared against one or more literal values represented as a set of values. A single rule may include only categorical features, only non-categorical features, or a mix of categorical and non-categorical features.

The classifier program 104 may apply the rules 108 in a predefined order until one rule is found for which all of the logical expressions on the left hand side of the arrow evaluate to true. When this occurs, the particular associated class specifier or target is assigned to the particular data item as its class.

Figure 6:
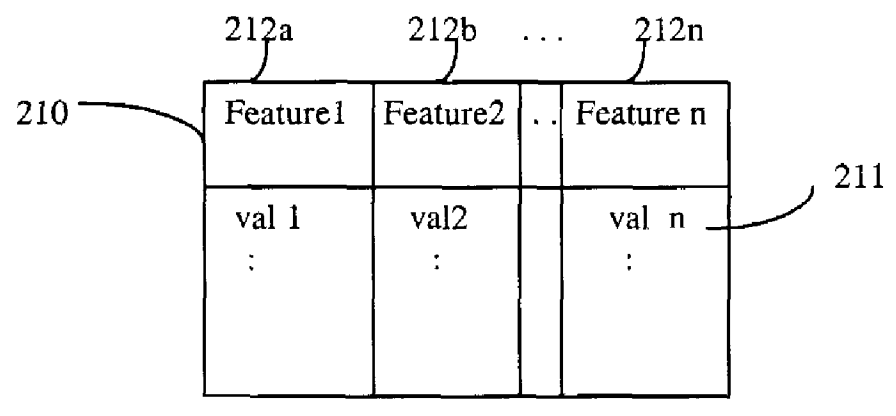

Referring now to FIG. 6, shown is an example of an input data set 210 that may represent the combined training and validation set 110 input to the rule generation program The input data set may be represented as table 210 where each row 211 represents a data point ("training pattern") and each column 212*a*-212*n* represents a feature (variable). In this embodiment, a boolean target is used such that one of the features or variables is designated the target and contains one of two unique values which may be encoded as the values 0 and 1 corresponding, respectively, to Boolean values of false and true. However, the target values may be any value that is representative of the target concept for the domain of interest. In one embodiment, the target takes on values "JOIN" and "NOT JOIN". The other features represent values of an observation of an attribute.

Techniques described in following paragraphs attempt to derive a set of conditions and rules that predict the value of the target variable from the values of the other features. These derived conditions can be used to accurately predict the target value for a data point whose feature values are known, but whose target value is not known. In the example described in following paragraphs, a method begins with a default rule: all data points should be classified as target value 0. The method then derives conditions (literals) which may be logically ANDed together to produce a rule which predict exceptions to the default. Each of these conditions corresponds to a logical expression as described in connection with the rules 108 in which each condition may be represented by a triple (attribute, operator, value) 108*a* or a pair (attribute, set of values) 108*b*. Several conditions may be logically ANDed together (a "conjunction of literals") to form a single rule. The system may learn many rules. In this embodiment, any input data point whose feature values satisfy the conditions of any of the rules are predicted to have target value 1 instead of the default value of 0.

It should be noted that the unclassified data 102 and the training and validation data 110 may be similarly represented in an embodiment as shown in the representation 210 of FIG. 6. The training and validation data 110 may be characterized as a particular instance of data items to produce a more general set of rules that should also be capable of classifying other data items, such as unclassified data 102.

Figure 7:
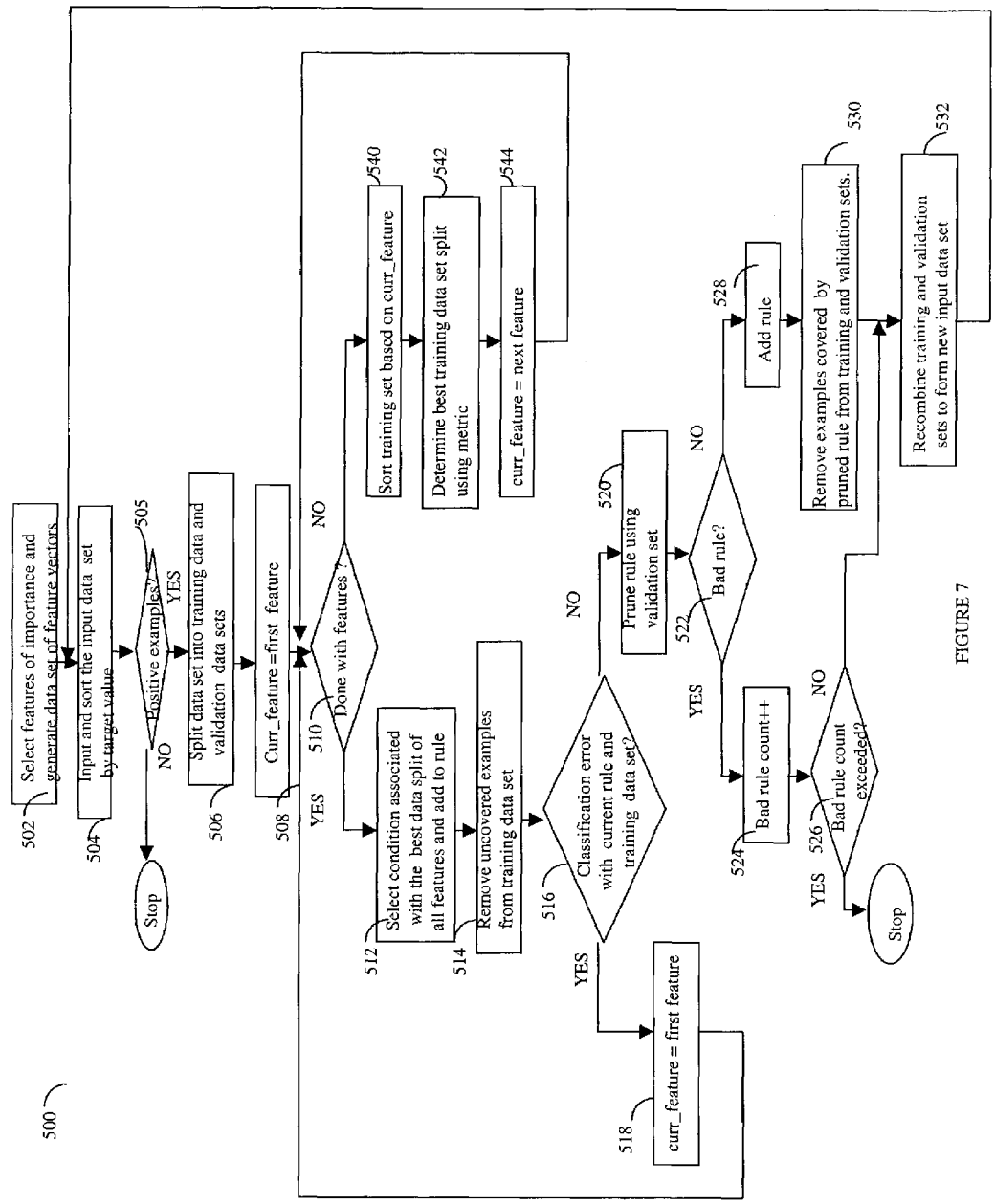
FIG. 7 is a flowchart of method steps of one embodiment for rule generation.

Referring now to FIG. 7, shown is a flowchart 500 of steps of one embodiment for rule generation. The steps included in the flowchart 500 may be executed by the Rule Generation Program 112 described elsewhere herein. The flowchart 500 sets forth method steps that may be referred to as an Incremental Reduced Error Pruning (IREP++) technique which, in this embodiment, is used with a rules-based system with boolean targets. It should be noted that the techniques described herein are not limited to this specific example system and have general applicability.

At step 502, features of importance are determined and the input data set of feature vectors is generated. The input data set may be as represented in the form 210 of FIG. 6. Any one of a variety of different techniques may be used to select particular features of importance. Features selected are highly correlated with, or are predictive of, each of the target values. Any one of a variety of different techniques may be used in feature selection. For example, an embodiment may manually perform feature selection, or use other techniques, such as the forward and backward feature selection technique. For example, the LNKnet data mining tool provides routines that perform feature selection as available at the web address:

www.II.mit.edu/IST/Inknet/index.html

Additionally, the text book entitled "Feature Extraction Construction and Selection: A Data Mining Perspective", Editors Huan Liu and Hiroshi Motoda, published by Kluwer International, 1998, ISBN:0-7923-8196-3 is a collection of articles on feature selection techniques that may be used in an embodiment.

It should be noted that step 502 may be performed at any point prior to performing the remainder of the steps included in the flowchart 500. An embodiment may perform feature selection, for example, immediately before performing other processing steps. An embodiment may also choose to perform feature selection, for example, several days or weeks prior to performing other processing steps.

Once features have been selected and the input data set is formed, control proceeds to step 504 where the data set is input by the rule generation program 112. The input data set 210 may be sorted on input such that rows of data having common target values, such as JOIN and NO JOIN, are grouped together within the table representation.

Control proceeds to 505 where a determination is made as to whether there are any positive examples in the input data set. If not, processing stops. Otherwise, if there are positive examples in the input data set, control proceeds to step 506 where the input data set may be randomly partitioned into two portions, a training data set and a validation set. In this example, a random number function may be used in determining which elements of the input data set are in each of the two portions. An embodiment may also preserve the distribution of JOIN/NO JOIN examples within each of the two portions. For example, if the input data set includes 20% NO JOIN targets and 80% JOIN targets, the input data set may be partitioned into the two portions so that this distribution is preserved, or approximately so. One technique known in the art for preserving the distribution is described in "The Art of Computer Programming", Volume 2, Second Edition, Section 3.4.2, P. 136, by Donald Knuth. It should be noted that an embodiment may preserve the distribution such that a system learns and validates in accordance with conditions of the recorded data to produce a more accurate model assuming the distribution of the recorded data accurately represents the distribution of a more general population.

Figure 8:
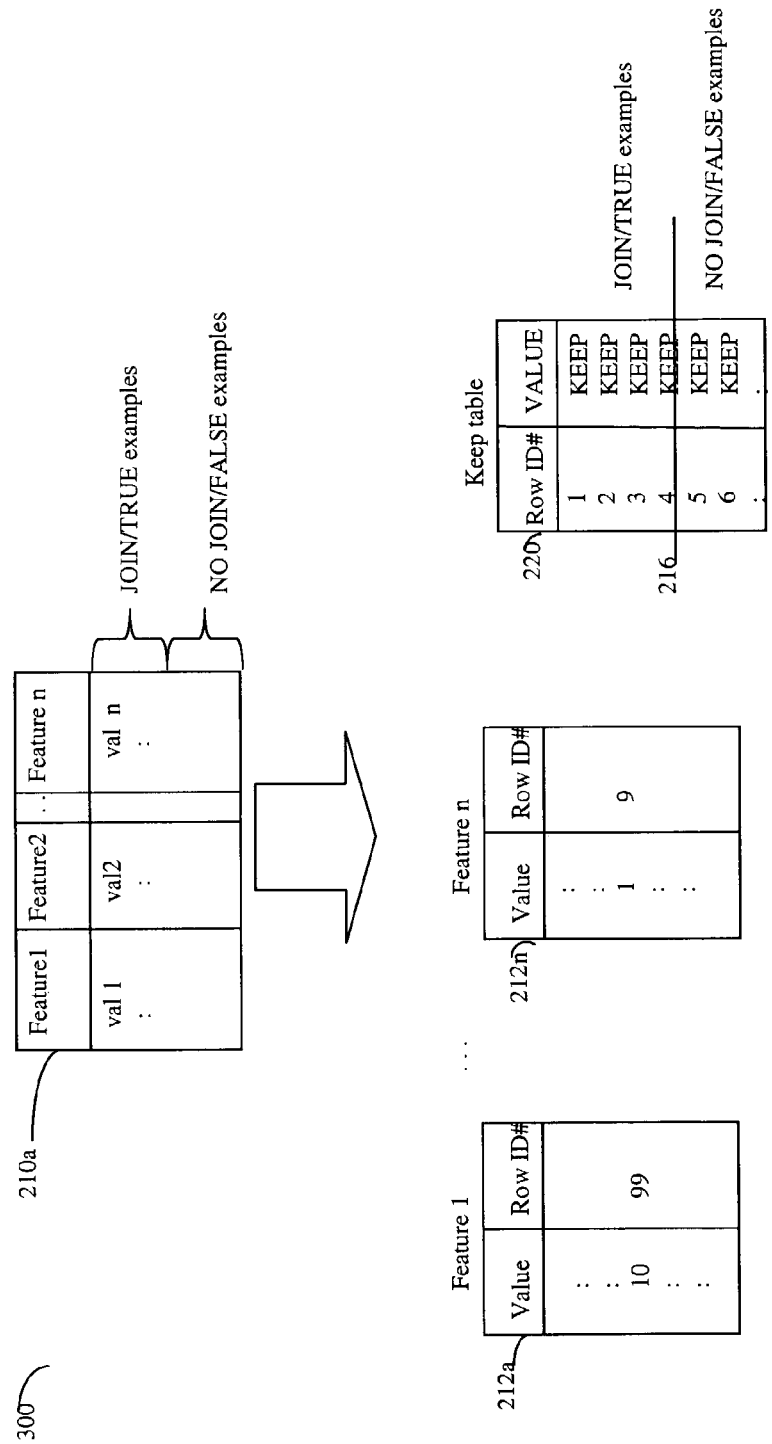
FIG. 8 is an example of data sets at various processing steps using the method of FIG. 7.

As part of step 506 processing, the training data set may be mapped from the representation 210a to the representation in accordance with feature tables 212a-212n and Keep tables 220 of FIG. 8 for use when performing other processing steps of the IREP++ technique of flowchart 500. The tables 212a-212n and Keep table 220 include a representation of only the training data set subsequent to executing step 506. The validation set does not need to be placed in feature vectors with an associated Keep table. Table 210a is a portion of the input data set 210 corresponding to the training data set in this example.

Each of the feature tables 212a-212n of the representation 300 includes data from one of the columns of the training data table 210a. Each entry of the tables includes a Row ID# associate with each Value. The Row ID# identifies the corresponding row from the original table 210a within which the Value occurs. Table 212a includes the values of feature 1 for each row of table 210a data, and table 212n includes the values of feature n for each row of table 210a data. Keep table 220 is a table of boolean values where there is one boolean value corresponding to each row of data included in the data set 210a. A value of KEEP in the Keep table 220 indicates that a corresponding row of data (Row ID#) is included in the training set. A value of NO KEEP indicates otherwise. At this point, the values in the Keep table 220 are all initially KEEP. The tables 220 and 212a-212n are updated at various points in subsequent processing steps It should be noted that an embodiment may not store the Row ID explicitly as represented in the table 220. For example, in one embodiment, the Keep table 220 may be implemented as an array in which the Row ID is used as an index into this array. Other embodiments may use other data structures to implement those items represented in FIG. 8 and described herein.

Once tables 212a-212n are populated, each of the tables 212a-212n may be sorted in subsequent processing steps in accordance with feature values included therein. The use of the Keep table 220 is described in connection with later processing steps of the flowchart 500 elsewhere herein.

Control proceeds to step 508, where a first feature corresponding to one of the feature vectors represented as one of 212a-212n is selected. At step 510, a determination is made as to whether all features in the tables 212a-212n have been processed. If not, control proceeds to step 540 where the training set is sorted based on the current feature. Using the representation tables 300, the current feature vector may be sorted independently of the other feature vectors. In other words, only the current feature vector values are sorted in connection with step 540 processing.

At step 542, the best training data split is determined for the sorted training data. In one embodiment, the sorted training data is repeatedly split at various points. For each split, a corresponding metric value is determined using the FOIL gain metric described, for example, in Chapter 10 of the text book entitled "Machine Learning", published 1997 by McGraw-Hill, ISBN 0-07-042807-7. The FOIL metric is determined at each split point in the sorted feature vector using the following:

$$p\left(\log_2 \frac{p}{p+n} - \log_2 \frac{p_0}{p_0+n_0}\right)$$

where p=the number of positive or JOIN examples below the split point, n=number of negative or NOJOIN examples below the split point, $p_0$=number of positive examples in the entire data set, and $n_0$=number of negative examples in the entire data set.

Step 542 processing involves determining the foregoing FOIL gain metric of the training data that is sorted in increasing order of the current feature vector values in which the split point is 1, then 2, and so on. The split point corresponds to a row in the current feature vector. The split point selected as the "best" as a result of step 542 processing is the split point with the largest associate FOIL gain metric value. Other embodiments may utilize other metrics to determine the split of the training data set sorted in accordance with values of data items for the current feature. Control proceeds to step 544 where the next feature is selected and the processing of steps 510, 540, 542 and 544 is repeated until a "best" split point has been determined for the training data in accordance with a sorted order based on each feature vector.

When all features vectors have been processed as determined at decision point 510, control proceeds to step 512 where the best data split of all the features is selected using the metric, such as the FOIL gain metric. The logical expression associated with the condition represented by the best split selected is added to the left side of the current rule being formed. Control proceeds to step 514 where examples uncovered with respect to the current rule are removed from the training data set. A row of data may be characterized as covered by a rule if the associated example meets the conditions in the rule, and may otherwise be characterized as uncovered. A row of data may be similarly, characterized as covered by a single condition (literal) if the condition is true for the features in the row.

More detailed processing of steps 512 and 514 are described in following paragraphs with reference made to the particular embodiment using the feature tables 212a-212n and the Keep table 220. The Keep table may be used with tables 212a-212n to indicate which examples or rows of training data are currently being utilized by the IREP++ processing steps of flowchart 500 in a particular iteration for growing a rule. Processing step 514, for example, updates the current training data set to remove those examples or rows of data which are not covered by the new condition selected as a result of processing step 512.

Figure 9:
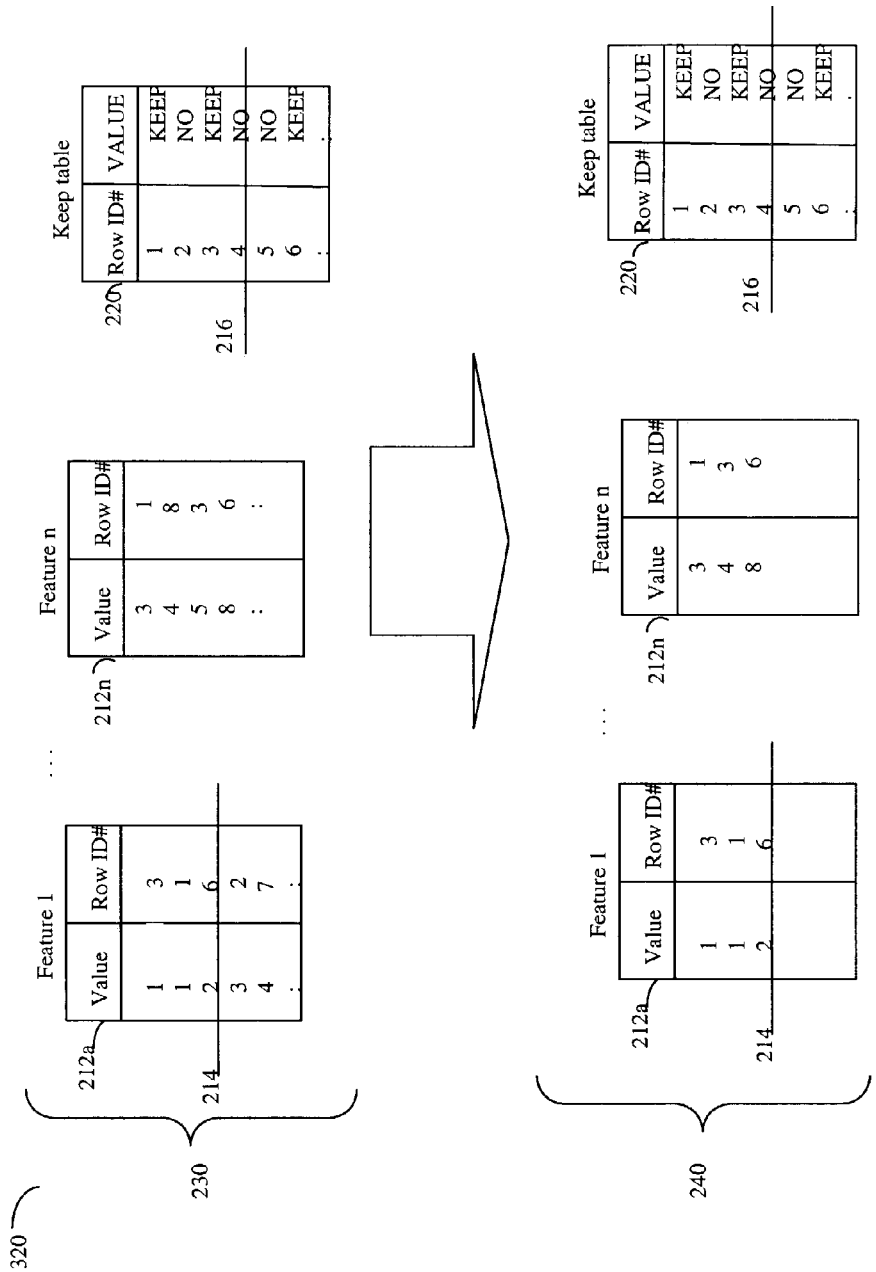
FIG. 9 is an example of the data sets of FIG. 8 as a result of performing other processing steps using the method of FIG. 7.

Referring now to FIG. 9, shown are representations 230 and 240 of the tables representing the training data set at two different processing points. The representation 230 may correspond to the tables subsequent to step 512 processing and the representation 240 may correspond to the tables subsequent to processing step 514. Consider, for example, an instance in which, after processing step 512, the best selected condition is "feature 1<2.5." This split is represented by the line 214 in table 212a. At step 514, the uncovered examples are removed. In this instance, all rows of data set 210a having "feature 1 greater than or equal to 2.5" are considered uncovered and are removed. This removal may be accomplished using the Keep table 220 and tables 212a-212n. A row of data that remains in the training data set 210a may be indicated by an entry VALUE of KEEP in the Keep table 220. Otherwise, the entry has a value of NO KEEP. Line 214 of Feature 1 table 212a illustrates the logical division of sorted feature 1 values in accordance with the condition "feature 1<2.5". The values above the line 214 meet the condition, and have the corresponding Row ID # entry in the Keep table 220 with a value of KEEP. All other rows of data have a corresponding entry in the Keep table 220 with a value of NO KEEP.

Using the IREP++ technique of flowchart 500 with the foregoing data structures, the Keep table is updated once for each condition or literal added to a rule. Each feature vector 212a-212n may then be compressed using the Keep table such that each feature vector includes only those examples indicated as KEEP. Referring again to FIG. 9, the tables 240 show revised versions of the tables 212a-212n after such compression. An embodiment may use any one of a variety of different techniques to copy the KEEP data and overwrite as needed data in the tables that is to be deleted.

It should be noted that an embodiment may not compress the Keep table 220 as shown in the representation 240 of FIG. 9 because of the implementation of the underlying structure as an array in which the row number or ID is an index into the table. Other embodiments may choose to compress the Keep table 220 such that it includes only those elements with values of KEEP prior to the next condition being selected and use other techniques to keep track of which Row ID corresponds to which entry in the Keep table 220.

The Keep table may be used to preserve the sorted input data in accordance with the JOIN and NOT JOIN apportionments. An index value into the Keep table 220 may be used to indicate a dividing line as to where the JOIN values end and the NO JOIN values start. This may be represented, for example, by the line 216 included in table 220 of FIG. 1.

As described herein, use of the Keep table 220 provides for maintaining a sorted order of the features for the training data set such that as examples are removed, all feature vectors or tables need only be sorted once per rule formation when selecting the first condition or literal. For subsequent conditions selected for the same rule, the Keep table 220 may be used to preserve the sort order of tables 212a-212n when adding conditions or literals for the same rule. When forming a new rule, the training set includes only those examples covered by the literals or conditions included in the rule so far.

Control proceeds to step 516 where a determination is made as to whether there is a classification error with the current rule and training data set. In other words, the currently formed rule is applied to the training data set reduced as a result of step 514 processing to determine if the currently formed rule properly classifies each example in the training data set. If there is a classification error, it means additional conditions (logical expressions) need to be added to the rule so control proceeds to step 518 where the current feature (Curr_feature) is assigned to first feature and control proceeds to step 510 where the next best split of all features is determined. This processing to add conditions continues to grow the current rule until, at step 516, it is determined that there is no classification error causing control to proceed to step 520.

It should be noted that using the techniques and data structures described herein, when determining subsequent conditions or literals to add to a rule, there is no need to execute step 540 processing to sort the feature vectors. The feature vectors are sorted only the first time each first condition or feature is added. Subsequently, the feature vectors are updated and maintained in sorted order, for example, when removing uncovered examples in step 514 processing. The next time the feature vectors are once again sorted is when there are new values included therein as a result of forming a new rule when the data sets are recombined, as in step 532 processing described elsewhere herein.

Subsequently, the currently formed rule may be overspecific with respect to the training data set due to the fact, for example, that there may be too many conditions on the left hand side of the rule. Accordingly, the currently formed rule is pruned using the validation set. Pruning may result in reducing the number of conditions. In this embodiment, the FOIL gain metric is used to evaluate which pruned rule is best. As described in more detail in following paragraphs, the technique used in this embodiment determines the FOIL gain metric for the original rule and then determines the FOIL gain metric for each of one or more pruned rules. A FOIL gain metric is determined for each pruned rule formed by successively removing single conditions in a last-in-first out (LIFO) fashion from the final rule. The pruned rule with the maximum FOIL gain metric is selected as the final rule.

Pruning may be performed in an embodiment as follows. The number of data points in the validation set covered by the unpruned rule whose target value is true (JOIN) is determined. This may be referred to as p. The number of examples in the validation covered by the unpruned rule whose target value is false (NOT JOIN) is then determined. This may be referred to as n. It should be noted that while literals or conditions are added to the rule until the currently formed rule covered no training patterns with target value false on the training set, the rule may cover some patterns with target value false in the validation set; hence n may be nonzero. The last literal from the unpruned rule is then removed. It is then determined how many examples from the validation set with target value true are covered by this new rule. This value is designated $p_0$. The number of patterns in the validation set covered by the new rule with target value false is designated $n_0$. Using the values calculated for p, n, $p_0$, and $n_0$, the FOIL gain of the new rule is calculated using the FOIL gain metric formula described elsewhere herein. The result is negated by being multiplied by −1. The last two literals are then removed from the original, unpruned rule and $p_0$ and $n_0$ are recalculated as before. The negative of the FOIL gain is again calculated. This process is repeated until all literals have been removed from the rule and all associated FOIL gains determined. The pruned rule which maximizes the negated FOIL gain metric is kept as the "final" pruned rule. The pruning provides for compensating the possibility of overtraining using the training data set. Removing conditions provides for a more generalized rule.

Using the foregoing FOIL metric in evaluating pruned rules, p and n are associated with the original rule formed before any pruning begins. $n_o$ and $p_o$ are associated with the currently formed pruned rule that varies with the removal of each condition or literal.

It should be noted that an embodiment may use other techniques for performing rule pruning in combination with other processing steps described herein.

When pruning a rule, as each condition or literal is removed, the rule becomes more general. Accordingly, if an example is covered by pruned rule at iteration "x", the same examples will also be covered by the pruned rule formed at iteration "x+1". In determining the error rate of each newly formed pruned rule by successively removing conditions, all examples do not need to be tested for each newly formed pruned rule. On a pruning iteration "x+1", the validation set used may be formed by eliminating from the validation set those examples covered by the pruned rule at iteration "x". It should be noted that this removal of examples from the validation set applies only for pruning this rule.

It should be noted that an embodiment may continually reduce the validation set for each pruning iteration of the current rule, as described above. Alternatively, one embodiment reduces the validation set only after the first pruning iteration. An embodiment may also reduce the validation set for any predetermined number of pruning iterations. One consideration as to the number of pruning iterations for which a validation set is reduced may include the overhead associated with keeping track of which elements or examples of the validation set are eliminated. This may vary in accordance with the data structures included in an embodiment.

Figure 10:
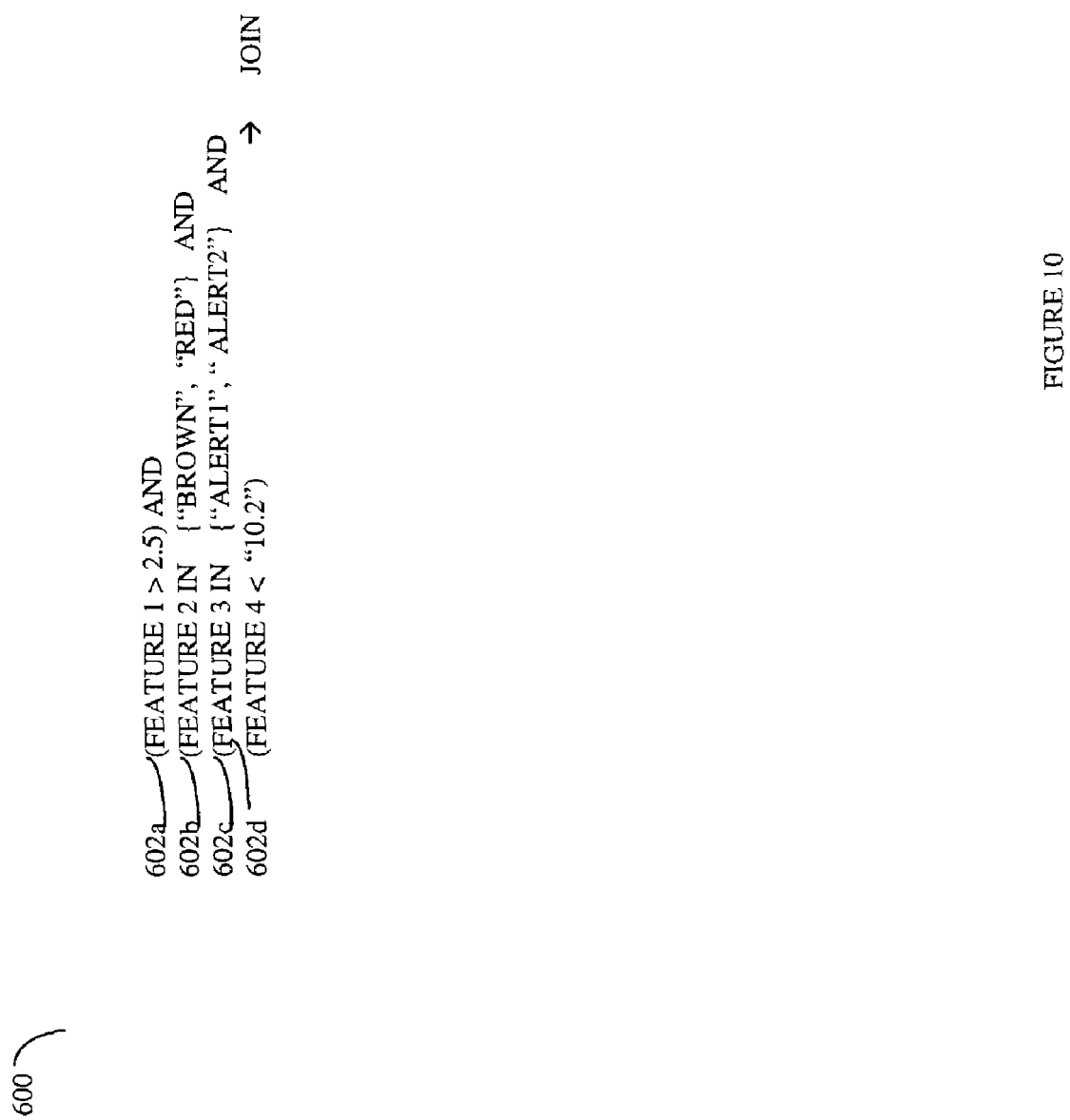
FIG. 10 is an example an example of a rule formed prior to pruning.

Referring now to FIG. 10, shown is an example of a rule 600 that may be formed and exist prior to pruning at step 520. Each of the logical expressions or conditions 602a-602d has been added to the rule subsequent to an iteration of step 512. The pruning process described above determines a FOIL gain metric by examining a first pruned rule formed by removing the condition 602d. A second FOIL gain metric is determined by examining a second pruned rule formed by removing conditions 602c and 602d. A third FOIL gain metric is determined by examining a third pruned rule formed by removing conditions 602b, 602c and 602d. A FOIL gain metric is determined for the original unpruned rule as well. The form of the rule with the highest FOIL gain metric is selected as the final rule that is used in step 522 processing. It should be noted that conditions 602b and 602c includes a categorical feature using set notation.

After the current rule is pruned, control proceeds to step 522 where it is determined if the current rule is a "bad rule". If the current rule is a bad rule, control proceeds to step 524 where the rule is discarded, and the total number of bad rules is increased by 1. Control proceeds to step 526 where a determination is made as to whether a predetermined stopping criteria is met. In this embodiment, the stopping criteria for rule formation in the IREP++ technique described herein with flowchart 500 processing is the formation of 5 "bad" rules. A rule may be classified as "bad" when there are more negative than positive training examples covered by the rule in the validation set. If the bad rule count or other stopping criteria has been met as determined by step 526, processing of the steps of flowchart 500 stops. Otherwise, control proceeds to step 532. If at step 522 it is determined that the final new rule is not a bad rule, the rule is added to the current set of rules generated at step 528, and control proceeds to step 530 where the examples included in the training and the validation set that are covered by the newly formed rule just considered by the pruning process are removed. Control proceeds to step 532.

The current training and validation data sets are recombined at step 532. The newly formed combined set is then used as a new input data set to continue processing on subsequent iterations beginning at step 504. Successive new rules are similarly formed until predetermined stopping criteria is met.

It should be noted that the input data set may include categorical data in addition to numerical data. Numerical data may be much more readily compared and sorted, as opposed to categorical feature data. What will now be described are techniques that may be used with categorical data processing in connection with the IREP++ processing steps of flowchart 500, for example, such as in step 512 where a subset of feature values that maximize the FOIL gain metric is determined.

Consider the following example. Suppose there is a feature 1. An example including feature 1 may have a value that is one of w possible alphanumeric strings. Each of the w possible feature values may be associated with a number of positive examples pp and a number of negative examples nn. A subset of feature values may be determined for each feature that maximizes the FOIL gain metric. For each feature, the technique described in following paragraphs performs a sorting of the categorical data in accordance with decreasing pp/nn ratios. Any sorting technique may be used. A linear search may then be performed on subsets of the feature values using the FOIL gain metric to determine an optimal subset of values. Below is a pseudo-code representation of the technique for use with categorical data selection for a particular feature:

Determine pp/nn ratio for each feature value 1..w
    Sort feature values 1..w in accordance with decreasing pp/nn ratio order
    num=1
    while num < w+1
    determine FOIL gain metric for combination of feature
        values 1..num
    num++
    end_while
    best_split= feature value combination having the MAX
    (all FOIL gain metrics)

This may be used, for example, to determine the best split in the table of a feature as a result of processing step 512. The foregoing technique allows an embodiment to compare categorical and non-categorical data using the same metric, the FOIL gain metric to select a condition or literal to be added to a rule currently being formed by the IREP++ processing. Using the foregoing technique, a subset of the features can be determined which is guaranteed to maximize the FOIL gain entry. In the foregoing, only w combinations of contiguous feature values sorted by associated pp/nn ratios are evaluated. The selected subset is guaranteed to be optimal and have the highest FOIL gain by examining only w subsets of a possible $2^w$ total number of subsets.

It should be noted that the techniques described herein for sorting and evaluating categorical data may generally be used in connection with other applications using categorical data.

The foregoing provides a machine learning technique that may be used to generate classification rules in an efficient and automated fashion. The foregoing handles processing of categorical and non-categorical (numeric) features and describes efficient techniques using the FOIL gain metric for producing the optimal split on categorical features in linear time. The foregoing uses particular data structures to reduce the amount of sorting time by describing a method in which each feature is sorted once per rule formed. Referring to FIG. 7, each feature vector is only sorted in step 540 the first time the loop formed by steps 510, 540 542 and 544 is executed if the data structures described herein are utilized. The foregoing also includes simple stopping criteria.

The embodiment including the rule generation techniques described herein uses boolean targets. However, the techniques described herein may also be used in connection with handling non-boolean targets. For example, the rule generation techniques may handle categorical targets taking on one of several unique non-numeric values. The input data may be sorted by target classification value in accordance with decreasing order of prevalence of each class in the training data set portion. In other words, the training data is classified by each target classification value. The target classification value that appears most in the training data is the most prevalent and may be characterized as the first class. The next most prevalent target classification value is determined and characterized as the second class, and so on for each target classification value. The input data set is then sorted in decreasing prevalence in accordance with each of these classes. The foregoing IREP++ technique described herein, such as discussed in connection with flowchart 500 of FIG. 7, may be executed iteratively using the sorted input data. For example, on a first iteration, rules are generated to separate the first class from all other classes. On the second iteration, rules are generated to separate the second class from all others, and so on. The processing steps of the IREP++ technique may be embodied in a subroutine that is iteratively invoked in which each call or invocation may be characterized as a classification problem with boolean targets. For example, the first iteration generates rules to determine whether an input item belongs to a first class C1 or not. The second iteration generates rules to determine whether an input item belongs to a second class C2 or not, and so on for each iteration. It should be noted that an embodiment may use the techniques described herein in connection with IREP++ in other ways and this is one example of how the foregoing techniques may be included in an embodiment to handle non-boolean target values.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for generating one or more classification rules for data mining comprising:
   determining attribute vectors of values of a training data set, wherein each attribute vector includes a feature value of a same feature for each example in said training data set;
   for each of said one or more classification rules, performing:
      sorting values of each of said attribute vectors in accordance with a ranking of values included in each of said attribute vectors producing sorted attribute vectors;
      determining a first condition of said each classification rule using the training data set, the first condition including a first feature and an associated value of said first feature determined to have a corresponding metric value that is a maximum of metric values for features and feature values in said attribute vectors;
      removing values from said sorted attribute vectors that are associated with examples included in said training data set that are uncovered with respect to said first condition while maintaining said sorted attribute vectors in sorted order, said removing producing a modified training data set; and
      determining at least one additional subsequent condition of said each classification rule using said sorted attribute vectors by performing, for each subsequent condition, processing including said first determining step using said modified training data set and said removing step; and
   storing said one or more classification rules, wherein said one or more classification rules are used by a classifier program to classify unclassified data; and
   wherein at least one of said attribute vectors is a categorical attribute vector and a best condition is determined for said categorical attribute vector which splits said training data in accordance with values included in said categorical attribute vector by determining a maximum metric value of one or more metric values associated with said categorical attribute vector, the method further including:
      associating with each attribute vector value of said categorical attribute vector a pp/nn ratio wherein pp represents a number of positive examples included in said training data set associated with said each attribute vector value and nn represents a number of negative examples in said training set associated with said each attribute vector value;

sorting attribute vector values of said categorical attribute vector in accordance with decreasing pp/nn ratio and being represented as an ordering from 1 to num inclusively, 1 representing an attribute vector value having a maximum pp/nn ratio of all attribute vector values included in said categorical attribute vector, and num representing an attribute vector value having a minimum pp/nn ratio of all attribute vector values included in said categorical attribute vector;

determining a metric value for each set of contiguously ordered attribute vector values from 1 to max, max having values ranging from 1 to num inclusively, num being at least equal to one, said each set of contiguously ordered attribute vectors being ordered in accordance with said sorting; and selecting a set of contiguously ordered attribute vector values having the maximum of said metric values.

2. The method of claim 1, further comprising:

pruning said each classification rule using a validation data set to produce a final pruned rule by successively removing conditions from an end of said each classification rule forming candidate pruned rules and determining a second metric value associated with each candidate pruned rule, said second metric value being represented as a negative value of:

$$p\left(\log_2 \frac{p}{p+n} - \log_2 \frac{p_0}{p_0+n_0}\right)$$

where p=a number of examples in said validation set covered by said each classification rule having a positive target value;

n=a number of examples in said validation set covered by said each classification rule having a negative target value;

$p_o$=a number of positive examples in said validation set covered by the candidate pruned rule currently being considered;

$n_o$=a number of negative examples in said validation set covered by the candidate pruned rule currently being considered; and selecting one of said candidate pruned rules as said final pruned rule, said final pruned rule having a second metric value that is a lowest of second metric values of said candidate pruned rules.

3. The method of claim 2, further comprising:

determining updated training and validation sets by removing examples covered by the final pruned rule.

4. The method of claim 1, further comprising:

forming at least one additional classification rule for classifying said input data until a predetermined stopping criterion is reached; and determining whether each of the rule and said at least one additional classification rule is a bad rule, wherein said predetermined stopping criterion includes forming rules until five bad rules are formed, wherein a rule is determined as bad if there are more negative than positive examples covered by said rule in a validation set, and a rule is determined to be not bad otherwise.

5. The method of claim 1, wherein said training data set is split at a position X associated with a particular example in said training data set, and each of said metric values associated with a set of contiguously ordered attribute values is represented as:

$$p\left(\log_2 \frac{p}{p+n} - \log_2 \frac{p_0}{p_0+n_0}\right)$$

where p=a number of positive examples below the position X for said set of contiguously attribute vector values;

n=a number of negative examples below the position X for said set of contiguously ordered attribute vector values;

$p_o$=number of positive examples in said training data; and $n_o$=number of negative examples in said training data.

6. The method of claim 3, further comprising:

updating a value corresponding to said example in a keep table indicating that said example is removed from said training data set; and removing any entries from attribute vectors corresponding to attribute vector values of said example removed.

7. The method of claim 6, wherein said training data includes only boolean target values for each example, and the method further comprising:

sorting said training data set such that examples having a positive boolean target value are grouped together in a first upper portion of said keep table and remaining examples having a negative boolean target value are grouped together in a remaining lower portion of said keep table.

8. The method of claim 7, wherein said sorting of said training data is performed prior to said step of sorting values of each of said attribute vectors when forming a first classification rule.

9. The method of claim 1, wherein an input data set includes said training data set and a validation data set, and said input data set includes at least one boolean target value.

10. The method of claim 1, wherein an input data set includes said training data set and a validation data set, and said input data set includes at least one non-boolean target value.

11. A computer-implemented method of forming each of a plurality of classification rules for classifying input data by determining a single condition of said each classification rule at a time, wherein, when forming a first condition, each of a plurality of attribute vectors including feature values associated with examples in said input data is sorted in accordance with feature values of said each attribute vector producing sorted attribute vectors, the first condition including a first feature and an associated value of said first feature determined to have a corresponding metric value that is a maximum of metric values for features and feature values in said plurality of attribute vectors, and said sorted attribute vectors are used when adding each next condition to said each classification rule such that said attribute vectors are sorted only when determining said first condition of said each classification rule, wherein each of said plurality of attribute vectors includes a feature value of a same feature for a portion of examples in said input data, and the method further comprising:

forming classification rules for classifying said input data until a predetermined stopping criterion is reached;

determining whether a classification rule is a bad rule, wherein said predetermined stopping criterion includes forming classification rules until a predetermined number of bad classification rules are consecutively formed, wherein a classification rule is determined to be bad if there are more negative than positive examples covered by said classification rule in a validation set, and determined to be a valid rule otherwise; and storing said plurality of classification rules, wherein plurality of classification rules are used by a classifier program to classify unclassified data.

12. The method of claim 11, wherein said predetermined number of rules is five.

13. The method of claim 11, wherein said input data includes at least one boolean target value.

14. The method of claim 11, wherein said input data includes at least one non-boolean target value.

15. A computer readable medium comprising machine executable code stored thereon that generates one or more classification rules for data mining, the computer readable medium comprising:

machine executable code that determines determining attribute vectors of values of a training data set, wherein each attribute vector includes a feature value of a same feature for each example in said training data set;

machine executable code that, for each of the one or more classification rules:

sorts values of each of said attribute vectors in accordance with a ranking of values included in each of said attribute vectors producing sorted attribute vectors;

determines a first condition of said each classification rule using the training data set, the first condition including a first feature and an associated value of said first feature determined to have a corresponding metric value that is a maximum of metric values for features and feature values in said attribute vectors;

removes values from said sorted attribute vectors producing a modified training set, said values removed being associated with examples included in said training data set that are uncovered with respect to said first condition while maintaining said sorted attribute vectors in sorted order; and determines at least one additional subsequent condition of said each classification rule using said sorted attribute vectors by executing, for each subsequent condition, other machine executable code including said machine executable code that determines a first condition using said modified training data set and said machine executable code that removes values; and machine executable code that stores said one or more classification rules, wherein said one or more classification rules are used by a classifier program to classify unclassified data; and wherein at least one of said attribute vectors is a categorical attribute vector and a best condition is determined for said categorical attribute vector which splits said training data in accordance with values included in said categorical attribute vector by determining a maximum metric value of one or more metric values associated with said categorical attribute vector, the computer readable medium further including machine executable code that:

associates with each attribute vector value of said categorical attribute vector a pp/nn ratio wherein pp represents a number of positive examples included in said training data set associated with said each attribute vector value and nn represents a number of negative examples in said training set associated with said each attribute vector value;

sorts attribute vector values of said categorical attribute vector in accordance with decreasing pp/nn ratio and being represented as an ordering from 1 to num inclusively, 1 representing an attribute vector value having a maximum pp/nn ratio of all attribute vector values included in said categorical attribute vector, and num representing an attribute vector value having a minimum pp/nn ratio of all attribute vector values included in said categorical attribute vector;

determines a metric value for each set of contiguously ordered attribute vector values from 1 to max, max having values ranging from 1 to num inclusively, num being at least equal to one, said each set of contiguously ordered attribute vectors being ordered in accordance with said sorting, and selects a set of contiguously ordered attribute vector values having the maximum of said metric values.

16. The computer readable medium of claim 15, further comprising:

machine executable code that prunes said each classification rule using a validation data set to produce a final pruned rule by successively removing conditions from an end of said each classification rule forming candidate pruned rules and determining a second metric value associated with each candidate pruned rule, said second metric value being represented as a negative value of:

$$p\left(\log_2 \frac{p}{p+n} - \log_2 \frac{p_0}{p_0+n_0}\right)$$

where p=a number of examples in said validation set covered by said classification rule having a positive target value;

n=a number of examples in said validation set covered by said classification rule having a negative target value;

$p_o$=a number of positive examples in said validation set covered by the candidate pruned rule currently being considered;

$n_o$=a number of negative examples in said validation set covered by the candidate pruned rule currently being considered; and the computer readable medium further comprising machine executable code that selects one of the candidate pruned rules as said final pruned rule, said final pruned rule having a second metric value that is a lowest value of second metric values of said candidate pruned rules.

17. The computer readable medium of claim 16, further comprising:

machine executable code that determines updated training and validation sets by removing examples covered by the final pruned rule.

18. The computer readable medium of claim 15, further comprising:

machine executable code that forms at least one additional classification rule for classifying said input data until a predetermined stopping criterion is reached; and machine executable code that determines whether each of the rule and said at least one additional classification rule is a bad rule, wherein said predetermined stopping criterion includes forming rules until five bad rules are formed, wherein a rule is determined as bad if there are more negative than positive examples covered by said rule in a validation set, and a rule is determined to be not bad otherwise.

19. The computer readable medium of claim 15, wherein said training data set is split at a position X associated with a particular example in said training data set, and each of said metric values associated with a set of contiguously ordered attribute vector values is represented as:

$$p\left(\log_2 \frac{p}{p+n} - \log_2 \frac{p_0}{p_0+n_0}\right)$$

where
p=a number of positive examples below the position X for said set of contiguously ordered attribute vector values;
n=a number of negative examples below the position X for said set of contiguously ordered attribute vector values;
$p_o$=number of positive examples in said training data; and
$n_o$=number of negative examples in said training data.

20. The computer readable medium of claim 17, further comprising:
machine executable code that updates a value corresponding to said example in a keep table indicating that said example is removed from said training data set; and
machine executable code that removes any entries from attribute vectors corresponding to attribute vector values of said example removed.

21. The computer readable medium of claim 20, wherein said training data includes only boolean target values for each example, and the computer program product further comprising:
machine executable code that sorts said training data set such that examples having a positive boolean target value are grouped together in a first upper portion of said keep table and remaining examples having a negative boolean target value are grouped together in a remaining lower portion of said keep table.

22. The computer readable medium of claim 21, wherein said machine executable code that sorts said training data is executed prior to sorting values of each of said attribute vectors when forming a first classification rule.

23. The computer readable medium of claim 15, wherein an input data set includes said training data set and a validation data set, and said input data set includes at least one boolean target value.

24. The computer readable medium of claim 15, wherein an input data set includes said training data set and a validation data set, and said input data set includes at least one non-boolean target value.

25. A computer readable medium comprising machine executable code stored thereon that forms each of a plurality of classification rules for classifying input data, the computer readable medium comprising machine executable code that determines a single condition of said each classification rule at a time, wherein, when forming a first condition, each of a plurality of attribute vectors including feature values associated with examples in said input data is sorted in accordance with feature values of said each attribute vector producing sorted attribute vectors, the first condition including a first feature and an associated value of said first feature determined to have a corresponding metric value that is a maximum of metric values for features and feature values in said plurality of attribute vectors, and said sorted attribute vectors are used when adding each next condition to said each classification rule such that said attribute vectors are sorted only when determining said first condition of said each classification rule, wherein each of said plurality of attribute vectors includes a feature value of a same feature for a portion of examples in said input data, and the computer readable medium further comprising machine executable code that:
forms classification rules for classifying said input data until a predetermined stopping criterion is a reached;
determines whether a classification rule is a bad classification rule, wherein said predetermined stopping criterion includes forming classification rules until a predetermined number of bad classification rules are consecutively formed, wherein a classification rule is determined to be bad if there are more negative than positive examples covered by said classification rule in a validation set and determined to be a valid classification rule otherwise; and
stores said plurality of classification rules, wherein said plurality of classification rules are used by a classifier program to classify unclassified data.

26. The computer readable medium of claim 25, wherein said predetermined number of rules is five.

27. The computer readable medium of claim 25, wherein said input data includes at least one boolean target value.

28. The computer readable medium of claim 25, wherein said input data includes at least one non-boolean target value.

* * * * *